Feb. 9, 1960 W. J. BURCH 2,924,467
BULKHEAD STUFFING TUBE
Filed July 15, 1953
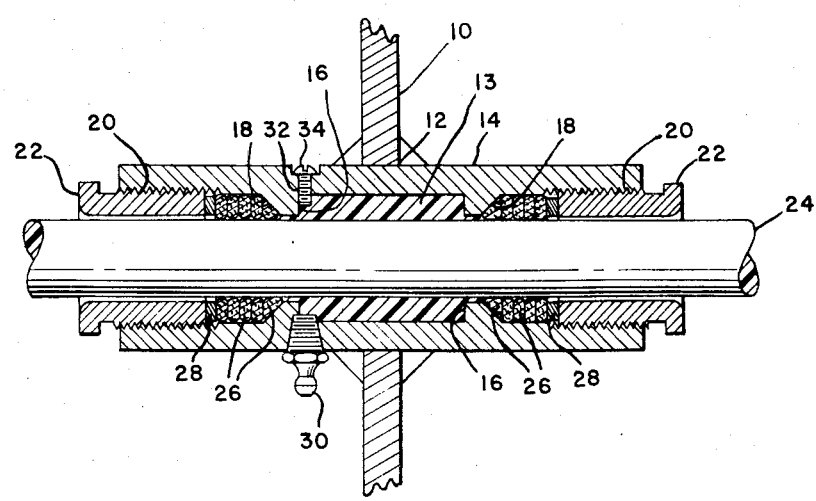
FIG. I.
INVENTOR
WILLIAM J. BURCH
BY George Sipkin
B. L. Zangwill
ATTORNEYS

United States Patent Office 2,924,467
Patented Feb. 9, 1960

2,924,467

BULKHEAD STUFFING TUBE

William J. Burch, Annapolis, Md.

Application July 15, 1953, Serial No. 368,239

3 Claims. (Cl. 286—1)

(Granted under Title 35, U.S. Code (1952), sec. 266)

The invention described herein may be manufactured and used by or for the Government of the United States of America for governmental purposes without the payment of royalties thereon or therefor.

This invention relates to a bulkhead stuffing tube and more particularly to a stuffing tube of the double ended type employing an ejection method of packing a resin into the tube for forming a water-tight fit.

The stuffing tubes of the prior art consist primarily of a cylindrical tube capable of receiving a cable, tube, or other object that must pass through a water-tight wall or bulkhead. Packing rings are placed in the tube in surrounding relationship with the cable and the opposite ends of the tube are interiorly threaded for receiving packing glands or plugs which are adapted to compress the packing rings tightly against the cable and inner walls of the tube for forming a water-tight fit.

A principal objection to the above-described stuffing tube is that the continual application and relieving of pressure on the tube tends to loosen the packing thereby causing leaks. The leaking tube creates an additional problem in that maintenance of the device is increased, and it not infrequently happens that it is extremely inconvenient and in some cases impossible to repair or replace the packing because of inaccessibility of the parts.

The present invention eliminates the above-noted disadvantages by providing a combination packing ring and sealing means for the tube which is capable of withstanding the forces created by the application of high pressures.

It is therefore an object of the invention to provide a stuffing tube capable of withstanding high pressures.

It is a further object of the invention to provide a tube having a center section which is adapted to be filled with a resinous compound for forming a water-tight fit.

Another object of the invention is the provision of a stuffing tube having a double seal comprising packing rings and a sealing compound adapted for adherence to the inner parts of the tube.

Another object of the invention is the provision of a method for forming a stuffing tube joint in which packing rings and a resinous compound are applied to a joint for forming a water-tight fit.

Other objects and features of the invention will be readily apparent from consideration of the following specification and claims relating to the annexed drawing wherein:

Figure 1 is a cross-sectional view in elevation showing the details of the stuffing tube joint.

Referring more specifically now to Figure 1, there is shown a bulkhead 10 having an aperture 12 through which is horizontally positioned a hollow cylindrical tube 14. The inner portions of the tube are provided with inwardly protruding shoulders 16 having diagonally formed surfaces 18 on their outer surfaces, and the opposite ends of the tube 14 are interiorly threaded for receiving packing glands or plugs 22.

Centrally positioned within tube 14 is a cable 24 passing from one side of the bulkhead to the other and which is to be placed in water-tight relationship with the tube. In order to achieve such a water-tight fit, packing members 26 are positioned around the cable and inserted into each end of hollow tube 14. These packing members are backed by a pair of retaining rings 28 which are employed for compressing the packing members into the area between the cable and inner peripheral portions of the tube upon the application of pressure by plugs 22.

In addition to the above described method of making the stuffing tube water-tight, there is also provided a sealing compound adapted for insertion into the annulus or void space 13 formed in the center part of the tube. In order to provide for injection of the sealing compound, an "Alemite" fitting 30 is threadably secured in the wall of tube 14, thereby providing access from the exterior portions of the tube to the annulus 13. An additional opening 32 is bored in the wall of tube 14 and is provided with a screw 34 or other securing means for closing the opening. This opening serves as a vent for venting air from the annulus 13 when the sealing compound is inserted therein through Alemite fitting 30.

Any type of cable or tube may be used with this stuffing tube and it is necessary to the successful operation of the device that the outer portions of the cable and the inner peripheral portions of tube 14 be thoroughly cleaned in order to provide a non-corroded surface to which the sealing compound can adhere. The particular type of cable described herein however, is that of a shielded type having a metal sheathing. The integrity of the seal is dependent upon the bonding of the resin to the tube wall and to the exposed sheathing of the cable as mentioned above, and both the dirt in the tube and the aluminum paint on the cable surface interfere with the obtaining of a satisfactory seal.

Various methods and compounds have been experimented with in attempting to achieve clean surfaces and the best results obtained resulted from the use of a caustic treatment. It is to be understood however, that various methods and compounds may be used for cleaning the tube and the cable positioned therein, depending of course upon the material used in the manufacture of the tube and in covering the cable.

In a particular application, the annulus 13 was filled with a hot 30% sodium hydroxide solution and allowed to react with the surfaces for approximately thirty minutes prior to draining. A thorough rinsing procedure then followed, during which fresh water was flushed through the tube and subsequently dried by the application of circulating air. A primer is required where particular resinous compounds are used, and in this instance, the primer is applied to the cable in the tube by filling and draining the latter several times. This fill and drain method of caustic treatment, rinsing, and primer application was chosen as most practical considering simplicity and the good results obtained in a majority of tests.

When the tube is thus prepared, the resinous compound is inserted through a "zerk" or "Alemite" fitting 30, until it overflows through open vent 32. The vent is then plugged and the annulus is gunned tight with resin to fill all interstices. An important result obtained by the use of the vent and "Alemite" fitting is that it becomes possible to apply pressure to the resinous compound after the vent has been closed. The application of such pressure is such that it can be determined at this time whether or not the packing rings 26 have been taken up with sufficient tightness to prevent leakage of the stuffing in the event the sealing compound fails for some reason or other. In other words, it is evident that this stuffing tube comprises a double seal consisting of the resinous compound on one hand and the use of packing rings on the other.

Many different types of resinous compounds can be used for sealing the cable in the manner described above. These compounds comprise three main classes, each of which consists of liquid polyester, liquid polyesterstyrene and liquid polysulphide base resins which are cured by the addition of suitable catalysts. For example, a liquid polysulphide base resin comprising thiokol synthetic rubber having an accelerator of lead peroxide pigment in a xylene vehicle was tested which produced excellent results as summarized below. Another sealing compound used consisted of a liquid polyester-styrene base resin having benzoyl or lauryl peroxide as a catalyst.

Each of the resins were tested with cables in stuffing tubes which were mounted in simulated bulkhead penetrations in the apparatus described above. Each tube was fitted with the length of the appropriate kind of cable and both ends were packed as also described above. The packing rings were sufficiently tightened to retain the resin during injection, but were not tightened after the resin had set prior to testing. Hydrostatic pressure of 500 p.s.i. gage was applied to one side of the bulkhead for approximately one-half hour to determine the initial tightness of the seal. Then, the installation was subjected to the following sequence of conditions for three complete cycles:

(A) The pressure was released and the cable and stuffing tube gradually heated to simulate heating of the cable and tube, by a surrounding water bath, until the cable reached the temperature of approximately 180° F.

(B) The hot water was drained and the cable and tube cooled with cold water.

(C) Hydrostatic pressure of 500 p.s.i. was again applied while compounds and packing were still warm. Pressure was maintained for one-half hour and leakage measured and recorded.

An analysis of the voluminous recordings taken is somewhat as follows:

The viscosity of the liquids ranged from light to heavy.

The pot-life or working time varied from one-half to one and one-half hours.

In all cases there was no appreciable shrinkage during cure except for the liquid polyester-styrene resin.

There were no apparent effects resulting from the application of temperatures approximating 180° F. on the cured resin.

The adhesion of each of these resins to degreased steel tube ranged from good to excellent.

The adhesion of the resin to cable armor ranged from fair to good.

The adhesion of the resins to cable sheathing ranged from fair to good and there was no apparent flow of any of the resins when subjected to 500 p.s.i. pressure.

From the above, it is apparent that the resins, such as that described in the examples above, contain very desirable features and are effective in withstanding the high pressures to which the stuffing tubes have been subjected, while still maintaining the quality of adherence for tube and cable surfaces.

It should be understood that the foregoing disclosure relates to only a preferred embodiment of the invention, and that it is intended to cover all changes and modifications of the example of the invention herein chosen for the purposes of the disclosure, which do not constitute departures from the spirit and scope of the invention as set forth in the following claims.

What is claimed is:

1. The method of sealing a cable in a wall comprising; positioning a hollow tube in said wall, inserting a cable in said tube, sealing the opposite ends of said cable in said tube, thereby forming an annulus between said sealed ends, treating the inner walls and cable in said tube with a caustic solution, and injecting a resinous compound under pressure into the annulus formed in said tube.

2. The method of sealing a cable in a wall comprising the steps of: affixing a tube in said wall, inserting a cable in said tube, sealing the ends of said cable in said tube to form an annulus therein, treating the inner wall and cable surfaces in said tube with a caustic solution, neutralizing the effect of said caustic solution on said surfaces, applying a primer to said surfaces, and injecting a sealing compound into the annulus formed in said tube.

3. The method of sealing a cable in a wall comprising the steps of: affixing a tube provided with an interior annulus in said wall, inserting a cable in said tube, cleaning the interior wall and cable surfaces in said tube with a cleaning solution, and injecting a resinous compound provided with a catalyst into the annulus formed in said tube.

References Cited in the file of this patent

UNITED STATES PATENTS

| | | |
|---|---|---|
| 1,042,587 | Moore | Oct. 29, 1912 |
| 1,523,822 | Marret | Jan. 20, 1925 |
| 2,247,671 | Tepel | July 1, 1941 |
| 2,394,609 | Hardesty | Feb. 12, 1946 |